United States Patent
Honig et al.

(10) Patent No.: US 6,574,232 B1
(45) Date of Patent: Jun. 3, 2003

(54) CROSSBAR SWITCH UTILIZING BROADCAST BUFFER AND ASSOCIATED BROADCAST BUFFER MANAGEMENT UNIT

(75) Inventors: Yoav Honig, Kfar Saba (IL); Meir Ohana, Hadera (IL); Amir Lahat, Kibbutz Givat-Brenner (IL)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/320,855

(22) Filed: May 26, 1999

(51) Int. Cl.[7] ............................................. H04L 12/00
(52) U.S. Cl. ...................................... 370/413; 370/414
(58) Field of Search ................................ 370/389, 390, 370/382, 230, 395.21, 235, 335, 463, 413, 357, 360, 386, 388, 412, 432; 710/29, 36, 131, 132; 709/208, 238

(56) References Cited

U.S. PATENT DOCUMENTS

| | | | |
|---|---|---|---|
| 4,623,996 A | * 11/1986 | McMillen | 340/2.1 |
| 4,823,338 A | 4/1989 | Chan et al. | 370/85 |
| 4,975,906 A | 12/1990 | Takiyasu et al. | 370/85.13 |
| 5,072,442 A | * 12/1991 | Todd | 370/230 |
| 5,214,646 A | 5/1993 | Yacoby | 370/85.14 |
| 5,268,896 A | * 12/1993 | Pauwels | 370/413 |
| 5,280,476 A | 1/1994 | Kojima et al. | 370/60.1 |
| 5,280,481 A | 1/1994 | Chang et al. | 370/85.13 |
| 5,315,582 A | 5/1994 | Morizono et al. | 370/16 |
| 5,321,693 A | 6/1994 | Perlman | 370/85.13 |
| 5,321,694 A | 6/1994 | Chang et al. | 370/85.13 |
| 5,329,527 A | 7/1994 | Ujihashi et al. | 370/85.13 |
| 5,329,619 A | 7/1994 | Page et al. | 395/200 |
| 5,345,558 A | 9/1994 | Opher et al. | 395/200 |
| 5,390,184 A | 2/1995 | Morris | 370/94.2 |
| 5,394,402 A | 2/1995 | Ross | 370/94.1 |
| 5,408,469 A | 4/1995 | Opher et al. | 370/60.1 |

(List continued on next page.)

FOREIGN PATENT DOCUMENTS

| | | | |
|---|---|---|---|
| EP | 0 785 697 A2 | 7/1997 | ........... H04Q/11/04 |
| WO | WO97/04386 | 6/1997 | ........... G06F/9/455 |
| WO | WO98/02821 | 1/1998 | ........... G06F/13/00 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

(List continued on next page.)

*Primary Examiner*—Huy D. Vu
*Assistant Examiner*—Daniel Ryman
(74) *Attorney, Agent, or Firm*—Howard Zaretsky (57) ABSTRACT

A crossbar switching system utilizing broadcast buffering and broadcast buffer management to improve the transmission of variable length broadcast packets through the switch. Transmission of unicast traffic is halted and a plurality of broadcast packets are transmitted consecutively. Once the broadcast packets have finished transmission, unicast packet transmission resumes.

Improved performance is achieved by consecutively transmitting many broadcast packets at a time, thus reducing the lengthy time waiting overhead typically associated with stopping unicast transmission and transmitting a single broadcast packet. A broadcast buffer or queue is placed on each interface card for storing broadcast packets during unicast transmission.

13 Claims, 7 Drawing Sheets

U.S. PATENT DOCUMENTS

| | | | | |
|---|---|---|---|---|
| 5,410,343 | A | 4/1995 | Coddington et al. | 348/7 |
| 5,444,702 | A | 8/1995 | Burnett et al. | 370/60.1 |
| 5,481,680 | A | 1/1996 | Larson et al. | 395/292 |
| 5,483,536 | A | 1/1996 | Gunji et al. | 370/85.14 |
| 5,519,704 | A | 5/1996 | Farinacci et al. | 370/85.13 |
| 5,548,646 | A | 8/1996 | Aziz et al. | 380/23 |
| 5,548,723 | A | 8/1996 | Pettus | 395/200.01 |
| 5,550,816 | A | 8/1996 | Hardwick et al. | 370/60 |
| 5,550,818 | A | 8/1996 | Brackett et al. | 370/60 |
| 5,566,014 | A | 10/1996 | Glance | 359/124 |
| 5,583,865 | A | 12/1996 | Esaki et al. | 370/397 |
| 5,600,644 | A | 2/1997 | Chang et al. | 370/404 |
| 5,633,869 | A | 5/1997 | Burnett et al. | 370/396 |
| 5,659,542 | A | 8/1997 | Bell et al. | 370/496 |
| 5,666,487 | A | 9/1997 | Goodman et al. | 395/200.76 |
| 5,726,985 | A | 3/1998 | Daniel et al. | 370/382 |
| 5,758,075 | A * | 5/1998 | Graziano et al. | 370/463 |
| 5,784,003 | A * | 7/1998 | Dahlgren | 340/2.2 |
| 5,784,374 | A | 7/1998 | Runaldue | 370/414 |
| 5,784,683 | A | 7/1998 | Sistanizadeh et al. | 455/5.1 |
| 5,790,534 | A * | 8/1998 | Kokko et al. | 370/335 |
| 5,790,548 | A | 8/1998 | Sistanizadeh et al. | 370/401 |
| 6,108,307 | A * | 8/2000 | McConnell et al. | 370/235 |
| 6,115,381 | A * | 9/2000 | Benenti et al. | 370/395.21 |
| 6,278,709 | B1 * | 8/2001 | Walker et al. | 370/392 |
| 6,330,223 | B1 * | 12/2001 | Shimonishi | 370/230 |
| 6,363,075 | B1 * | 3/2002 | Huang et al. | 370/390 |

OTHER PUBLICATIONS

"All–optical ATM–Switch based on Self Electro–optic Effect Devices (SEED's)", printed from website http://www.stw.nl/projecten/T/tel3997.html, 2 pages, Feb. 2, 1997.

Tzeng, Hong–Yi et al., "On Max–Min Fair Congestion Control for Multicast ABR Service in ATM", *IEEE Communications*, vol. 15, No. 3, Apr. 1997, pp. 545–555.

Simpson, W., "IP in IP Tunneling", Request for Comments #153, Oct. 1995, 9 pages.

Swallow, G., "Frame Relay PVC Multicast Service and Protocol Description", FRF.7, Frame Relay Forum Implementation Agreement, Oct. 21, 1994, printed from internet site www.frforum.com, 17 pages.

Cisco—"Packet Services", printed from website http://www.cisco.com/warp/public/732/Tech/pksrv_tc.html, 32 pages, Dec. 1995.

Deering, S., "Host Extensions for IP Multicasting", Request for Comments (RFC) 1112, Stanford University, 16 pages, Aug. 1989.

Egevang, K. et al., "The IP Network Address Translator (NAT)", Request for Comments (RFC) 1631, Cray Communications, 12 pages, May 1994.

"All About . . . Multicast Wide Area Network Services", printed from website http://www.starburstcom.com/mcast.html, 11 pages, Feb. 1997.

Ellington, B. (Ed.), LAN Emulation SWG Drafting Group, "LAN Emulation Over ATM Specification—Version 1.0", ATM Forum, pp. 1–139, (1995).

Novell NetWare Network Computing Products 3.12, "NetWare 3.12 Concepts", Novell, Inc., USA, Part No.: 100–001715–001, Jul. 1993, pp. 158–163.

Novell NetWare Network Computing Products 3.12, "TCP/IP Transport Supervisor's Guide", Novell, Inc., USA, Part No. 100–001866–001, May 1993, pp. B–15–B.22.

Kwok, T., "ATM: The New Paradigm for Internet, Intranet and Residential Broadband Services and Applications", Prentice–Hall, pp. 214–215 and 256–258 (1998).

* cited by examiner

CROSSBAR SWITCH UTILIZING BROADCAST BUFFER AND ASSOCIATED BROADCAST BUFFER MANAGEMENT UNIT

FIELD OF THE INVENTION

The present invention relates generally to data communication switching systems and more particularly relates to a cross bar switching matrix having improved broadcast performance via the utilization of broadcast buffering and management.

BACKGROUND OF THE INVENTION

More and more reliance is being placed on data communication networks to carry increasing amounts of data. In a data communications network, data is transmitted from end to end in groups of bits which are called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from a source to a destination. Alternatively, the application may wish to send the data unit to multiple destinations.

Currently, many switching systems utilize switching fabrics or matrixes that are designed to switch variable length packets of data. The variable length of packets in these switching systems, however, offer larger and less predictable switching delays as packet switching is more complex than fixed length packet switching.

Unicast, Broadcast and Multicast

The transmission of data to a single destination is termed unicast data while the transmission of data to all destinations is termed broadcast data. The transmission of data to a select number of destinations larger than one is termed multicast data. In an example switching system, each call connection within the switch has associated with it a routing tag or equivalent that functions to identify the destination for the packet.

For unicast connections, the routing information identifies a single destination for the packet. For broadcast connections, the routing information identifies the packet as a broadcast packet that is to be distributed to all output ports. For multicast connections, the routing information identifies several destinations for the packet.

A majority of data communication networks today attempt to not lose even a single bit of information in transmitting data from one point to another. In order to achieve such high levels of performance and low error rates, the network equipment is constructed with relatively large sized queues. The large queues are needed in order to handle the accumulation of packets without overflowing the queues. An overflow of a queue will result in packets being lost, i.e., dropped. Packets may be dropped at the source queue if the destination is full and thus cannot receive additional packets. In this case, the source queue fills up and at some point will overflow, with consequent packet loss.

A problem arises, however, with the transmission of broadcast packets through the switching matrix. In prior art switching systems, the switch must wait until the matrix tracks are cleared before a broadcast packet can be transmitted through the switch. All the output ports of the switch matrix must be free before the broadcast packet can be transmitted. This results in very large delays, which greatly reduces the efficiency and throughput of the switch matrix. The following example illustrates this problem.

Figure 1:
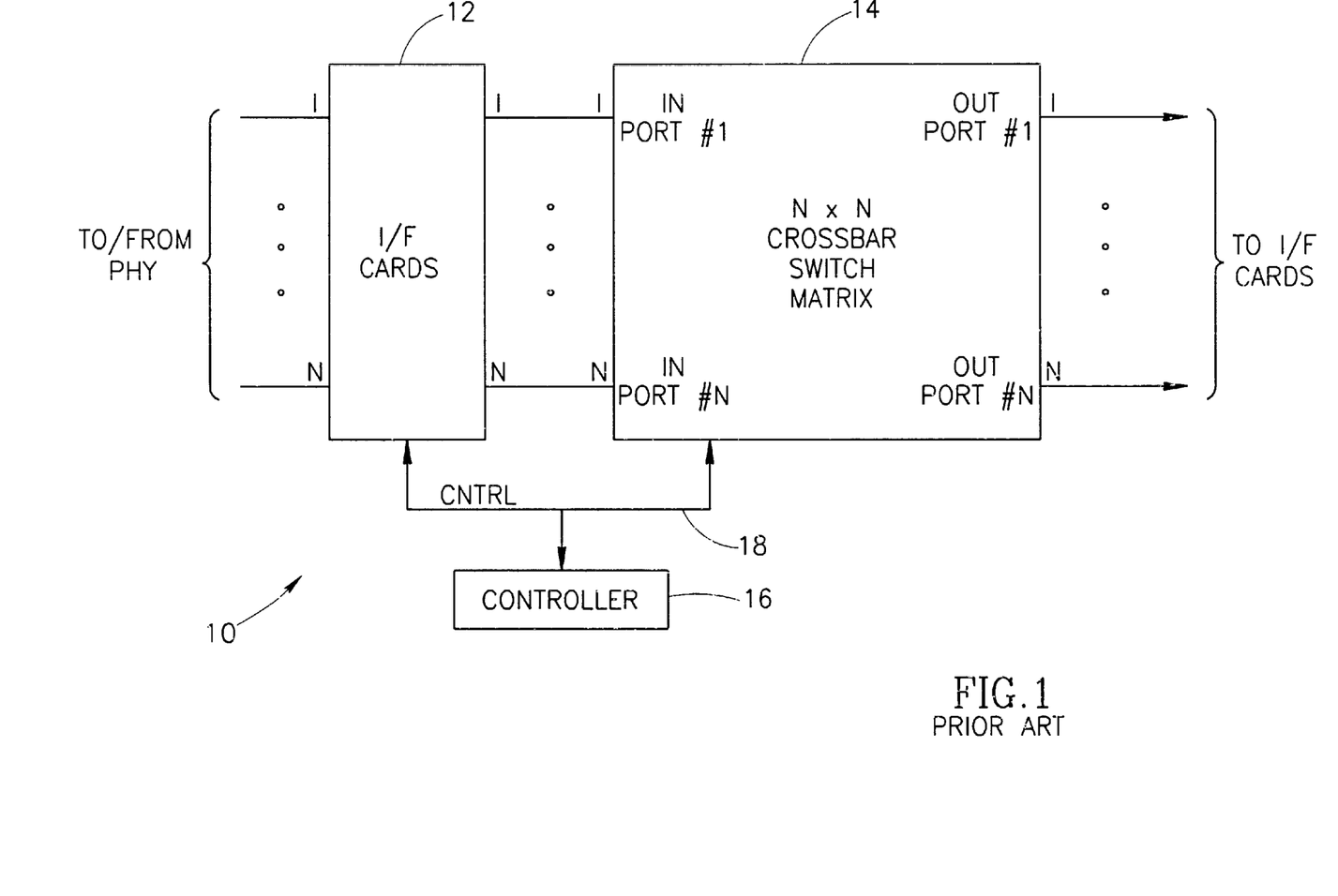
FIG. 1 is a block diagram illustrating an example prior art crossbar switch matrix capable of handling unicast, broadcast and multicast traffic.

A block diagram illustrating an example prior art crossbar switch matrix capable of handling unicast, broadcast and multicast traffic is shown in FIG. 1. The switching system, generally reference 10, comprises a plurality of input/output (I/O) interface (I/F) cards 12 having a plurality of PHY interfaces, labeled 1 through N, and a plurality of outputs, labeled 1 through N. The system 10 further comprises an N×N crossbar switch matrix 14 having N input ports and N output ports. The N outputs of the I/F cards 12 are coupled to the N input ports of the switch matrix 14. The N output ports of the switch matrix 14 are input back to the I/F cards 12. A controller 16 functions to control the configuration of the switch matrix 14 at any particular point in time via one or more control lines 18 labeled CNTRL.

The crossbar switch is required to switch the entire set of input ports to the output ports in accordance with configuration information from the controller 16. The controller 16 is responsible for providing the appropriate configuration information to the crossbar switch matrix 14 at the correct time. The crossbar switch 14 performs the switching operation in accordance with the switching information provided by the controller. In the event a broadcast packet is to be transmitted from any of the I/F cards, the configuration controller 16 provides the appropriate switching commands which cause the broadcast packet to be transmitted to all the output ports. This is achieved by the issuance of the suitable configuration commands to each I/F card. All I/F cards (except the one transmitting the broadcast packet) and all the input ports will be in the idle state for a broadcast transmission to occur.

In operation, the format of the received signal is converted to packets and forwarded to the ingress of the switching matrix. The I/F card determines a destination output port on the switch matrix for input data received over the PHY I/O channel.

When packets are output of the switch matrix, they return to the I/F card corresponding to the output port. The packet is then output to the PHY via a PHY interface.

A disadvantage of this prior art switching architecture is that the transmission of broadcast packets occurs only when all the input ports are in the idle state, i.e., they are not in the middle of transmitting a packet of data. In addition, during the transmission of a broadcast packet, all the I/F cards, except the one transmitting the broadcast packet, are also in the idle state. Since the switch is constructed to transmit variable length packets, the waiting time until all the I/F cards and input ports are in the idle state, i.e., have completed their current packet transmissions, is also variable and may be very long. An illustration of this problem is provided below.

Figure 2:
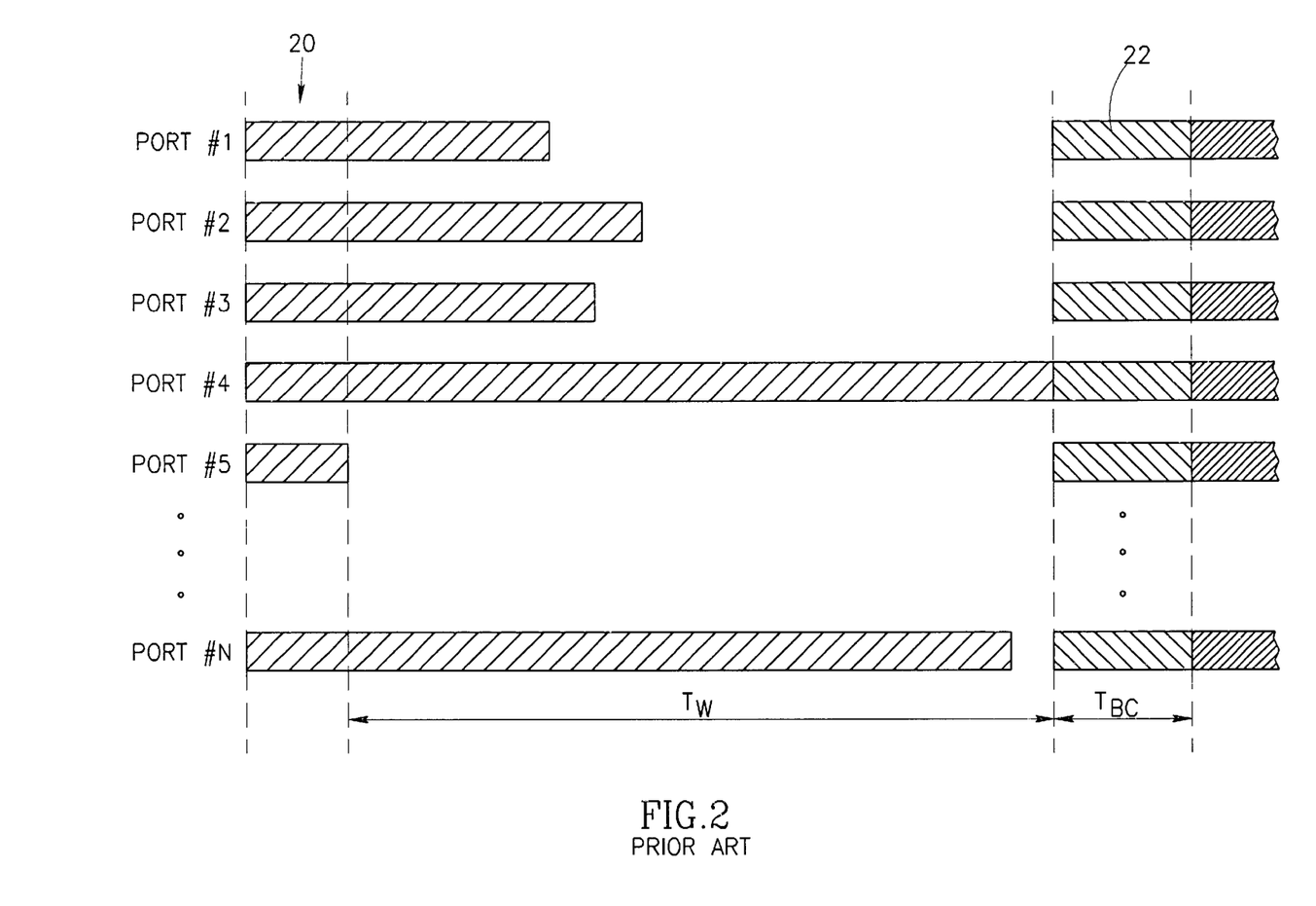
FIG. 2 is a diagram illustrating the timing of the transmission of packets through a prior art switch matrix before and after a broadcast packet is scheduled for transmission.

A diagram illustrating the timing of the transmission of packets through a prior art switch matrix before and after a broadcast packet is scheduled for transmission is shown in FIG. 2. Assume that prior to the point in time represented by reference arrow 20 in FIG. 2, that each input port is in the midst of receiving a data stream comprising variable length packets. Each line represents a different egress output port from the switch matrix. The output ports comprise output ports #1 through output ports #N but only output ports #1 through #5 and #N are shown for clarity sake. The switch matrix creates a traffic stream from input ports to output ports.

Assume also that at time represented by reference arrow 20, a controller on the switch matrix is notified of a broadcast packet ready for transmission in one of the I/F cards. At this point, the controller ceases starting any new packet transmissions and waits until the busy ports finish their transmissions of the current packet. After the last port has completed transmission, the controller configures the switch matrix to transmit the broadcast packet to all the output ports. Once the broadcast packet has completed transmission through the switch, new packets queued up in each of the I/F cards begin transmission through the switch matrix to the output ports and normal unicast packet flow resumes.

With reference to FIG. 2, the waiting time $T_W$ can be relatively large compared to the transmission time of some of the packets. The controller must wait for the longest length packet to finish transmission before sending the broadcast packet. The waiting time $T_W$ in this case extends from the end of the packet output from port #5 to the end of the packet output from port #4. Only at that point can the broadcast packet 22 be transmitted through the switch. The time of transmission of the broadcast packet is denoted by $T_{BC}$. The waiting time $T_W$, i.e., unutilized slot time, before transmitting the broadcast packet causes a large decrease in performance. This problem is even more acute when the switch is capable of operating at very high speeds.

SUMMARY OF THE INVENTION

The present invention is a crossbar switching system that utilizes broadcast buffering and broadcast buffer management to improve the transmission of variable length broadcast packets through a switch. The invention provides for greatly increased performance when transmitting broadcast packets through a switch matrix. The invention achieves this by halting the transmission of unicast traffic and transmitting a plurality of broadcast packets consecutively. Once the broadcast packets have finished transmission, unicast packet transmission resumes.

The invention achieves improved performance by consecutively transmitting many broadcast packets at a time, thus reducing the lengthy time waiting overhead typically associated with stopping unicast transmission and transmitting a single broadcast packet.

A broadcast buffer or queue is placed on each interface card for storing broadcast packets during unicast transmission. In a first embodiment, a broadcast buffer management unit is also provided on each I/F card and controls the operation of the broadcast buffer.

In a second embodiment, the switching system only comprises a single broadcast buffer management unit, located on the switch matrix, for example, and is adapted to provide control of the broadcast buffers on each interface card.

Note that the crossbar switch matrix of the present invention is applicable to any switching matrix that is adapted to switch variable length data units, e.g., packets, frames, etc. The invention is applicable to both electrical and optical switches, wherein in the latter case, the optical based physical transmission signals are converted from optical to electrical before arriving at the crossbar matrix and are converted back to optical after egressing from the crossbar matrix.

There is provided in accordance with the present invention a crossbar switching system for use with variable length unicast and broadcast packets comprising an N×N crossbar switch matrix comprising N input ports and N output ports, the switch matrix adapted to couple data present at any input to any output port in accordance with switch configuration commands and N interface (I/F) circuits, each I/F circuit coupled to a corresponding input port on the switch matrix, each IF circuit comprising N unicast queues, each unicast queue coupled to a corresponding output port on the switch matrix, a broadcast buffer coupled to the corresponding output port on the switch matrix and adapted to store a plurality of broadcast packets and a broadcast buffer management unit adapted to periodically halt the transmission of unicast packets to the crossbar switch matrix to permit the consecutive transfer of broadcast packets thereto, the broadcast buffer management unit adapted to store broadcast packets arriving to the I/F circuit in the broadcast buffer, the broadcast buffer management unit operative to consecutively transfer the contents of the broadcast buffer to the crossbar switch matrix while the transmission of the unicast packets is suspended, the transmission of the unicast packets resuming following the completion of transmission of the broadcast packets.

There is also provided in accordance with the present invention a crossbar switching system for use with variable length unicast and broadcast packets comprising an N×N crossbar switch matrix comprising N input ports and N output ports, the switch matrix adapted to couple data present at any input to any output port in accordance with switch configuration commands, the crossbar switch matrix comprising a management bus adapted to send and receive a plurality of broadcast buffer management control and status signals, a broadcast buffer management unit coupled to the management bus, N interface (I/F) circuits, each I/F circuit coupled to a corresponding input port on the switch matrix, each I/F circuit comprising N unicast queues, each unicast queue coupled to a corresponding output port on the switch matrix, a broadcast buffer coupled to the corresponding output port on the switch matrix and coupled to the management bus, the broadcast buffer adapted to store a plurality of broadcast packets and wherein the broadcast buffer management unit adapted to periodically halt the transmission of unicast packets to the crossbar switch matrix to permit the consecutive transfer of broadcast packets thereto, the broadcast buffer management unit adapted to store broadcast packets arriving to the I/F circuit in the broadcast buffer, the broadcast buffer management unit operative to consecutively transfer the contents of the broadcast buffer to the crossbar switch matrix while the transmission of the unicast packets is suspended, the transmission of the unicast packets resuming following the completion of transmission of the broadcast packets.

BRIEF DESCRIPTION OF THE DRAWINGS

The invention is herein described, by way of example only, with reference to the accompanying drawings, wherein.

DETAILED DESCRIPTION OF THE INVENTION

General Description

The present invention is a crossbar switching system that utilizes broadcast buffering and broadcast buffer management to improve the transmission of variable length broadcast packets through the switch. The invention provides for greatly increased performance when transmitting broadcast packets through the switch matrix. The invention achieves this by halting the transmission of unicast traffic and inserting broadcast traffic. Once the broadcast packet has finished transmission, unicast packet transmission resumes.

A broadcast buffer or queue is placed on each interface card. In a first embodiment, a broadcast buffer management unit is also provided on each I/F card and controls the operation of the broadcast buffer.

In a second embodiment, the switching system only comprises a single broadcast buffer management unit that functions to provide control of the broadcast buffers on each interface card.

Note that the crossbar switch matrix of the present invention is applicable to any switching matrix that is adapted to switch variable length data units, e.g., packets, frames, etc. The invention is applicable to both electrical and optical switches, wherein in the latter case, the optical based physical transmission signals are converted from optical to electrical before arriving at the crossbar matrix and are converted back to optical after egressing from the crossbar matrix.

Figure 3:
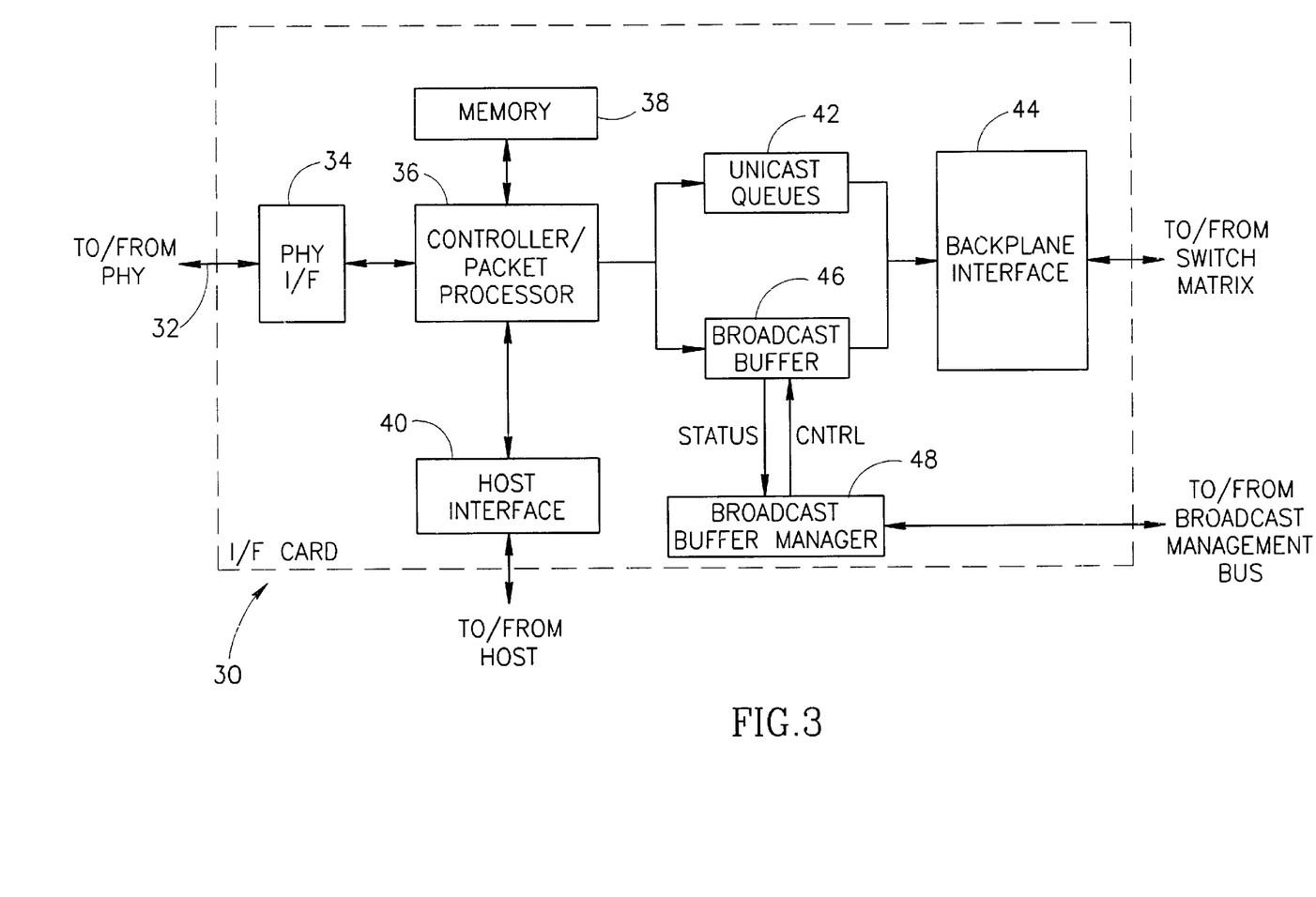
FIG. 3 is a block diagram illustrating the I/O interface card of a first embodiment of the present invention.

The interface card of the first embodiment of the present invention will now be described. A block diagram illustrating the I/O interface card of a first embodiment of the present invention is shown in FIG. 3. The I/O card 30 comprises a PHY interface 34 to/from a physical connection 32. The I/O card also comprises a controller/packet processor 36, memory 38, output unicast queues 42, input queue from the switch matrix (not shown), host interface 40 and backplane interface 44. The I/F card also comprises a broadcast buffer 46, i.e., queue, and a broadcast buffer management unit 48.

The unicast queues 42 comprise N output queues, with each queue corresponding to a different output port of the switch matrix. Each unicast queue is used to store unicast packets until being input to the switch matrix. The broadcast buffer 46 functions to buffer packets to be broadcast to all output ports. Note that the queues (i.e. buffers) may optionally be implemented using the memory 38. The queues interface to the switch matrix via a backplane interface 44.

The PHY interface 34 is coupled to a controller/packet processor 36 that functions to receive packets and route them to the appropriate output queue. Note that the PHY interface 34 may be adapted to handle electrical or optical signals, e.g., OC-3, OC-12, SONET, 1000BaseT, etc.

In operation, the format of the received signal is converted to packets and input to the packet processor 36. The packet processor 36 functions to process the data destined to the ingress of the switching matrix and to process the data output from the egress of the switching matrix. The packet processor, in accordance with the connection information, determines a destination output port for data received over the PHY I/O channel. For unicast transmission, the packet processor places the packet in one of N queues 42 corresponding to one of N output ports. For broadcast connections, the packet is placed in the broadcast buffer 46 for eventual broadcast to all output ports simultaneously.

When packets are output of the switch matrix, they return to the I/F card corresponding to the output port. A backplane interface 44 interfaces the input and output queues to the switch matrix. Packets destined to an output queue on a particular I/F card, are input to an output queue (not shown) via the backplane interface 44. The packet is then input to the packet processor 36 and output to the PHY via the PHY interface 34.

Note that a unicast queue is a physical queue that accumulates packets designated to be transmitted to a single destination queue and is associated with a point to point connection. The broadcast buffer is a physical buffer (queue) that accumulates packets designated to be transmitted to all destination queues.

As described previously in the Background Section of this document, the disadvantage of the prior art is that every broadcast transmission required that all unicast traffic cease with the consequent long wait times for long unicast packets to finish transmission. This waiting time is repeated every time broadcast packets are to be transmitted through the switch matrix following unicast transmission, resulting in very high overhead in terms of time per broadcast transmission.

In accordance with the present invention, the time overhead per broadcast transmission is significantly reduced after unicast transmission by the use of broadcast buffers. In operation, the packets to be broadcast are stored in the broadcast buffers located on each interface card. At a predetermined time, unicast transmission is halted and the contents of the broadcast buffer are transmitted through the switch matrix in consecutive packet streams.

A broadcast buffer management unit in each interface card functions to monitor and control the broadcast buffer. In particular, the broadcast buffer management unit 48 receives status about the broadcast buffer 46 including but not limited to level, i.e., empty, half full, full, number of packets, etc. In the control direction, the broadcast buffer management unit functions to control transmission of packets out of, and optionally into, the broadcast buffer.

The decision to halt unicast transmission can be based on a plurality of criteria, all considered to be within the scope of the present invention. For example, the broadcast buffer management unit may track the number of packets in the broadcast buffer and the buffer empties only after a threshold is exceeded. Alternatively, the broadcast buffer management unit may wait a particular period of time before transferring the contents of the buffer regardless of the number of packets contained therein.

In accordance with the invention, the I/F card operates in either of two states: a unicast state or a broadcast state. In the unicast state, the I/F card transmits unicast packets from the N unicast queues 42. After some time, the I/F card switches to the broadcast state and transmits packets from the broadcast buffer. Switching to the broadcast state causes unicast transmission to cease after the last packet, i.e., longest packet, finishes transmission through the switch. At that point the broadcast buffer is accessed in all the I/F cards so as to enable all the buffered broadcast packets to be transmitted.

Depending on the broadcast transmission scheme used, broadcast transmission eventually ceases and the system returns to the unicast state. Many alternative schemes may be implemented, all contemplated by the present invention. For example, broadcast transmission may be enabled only for a specific period of time. Alternatively, it may be enabled for a particular number of packets from each broadcast buffer. Further, broadcast transmission may be enabled until all broadcast buffers on all I/F cards are emptied.

Utilizing the system of the present invention, enables broadcast packets to be transmitted through the crossbar switch matrix in bursts with a consequent large decrease in the number of broadcast after unicast transmission events. In other words, the overhead of waiting for the last unicast packet to finish transmission is now spread over a far larger number of broadcast packets resulting in a much smaller per packet waiting time, far less bandwidth waste and much higher performance.

Figure 4:
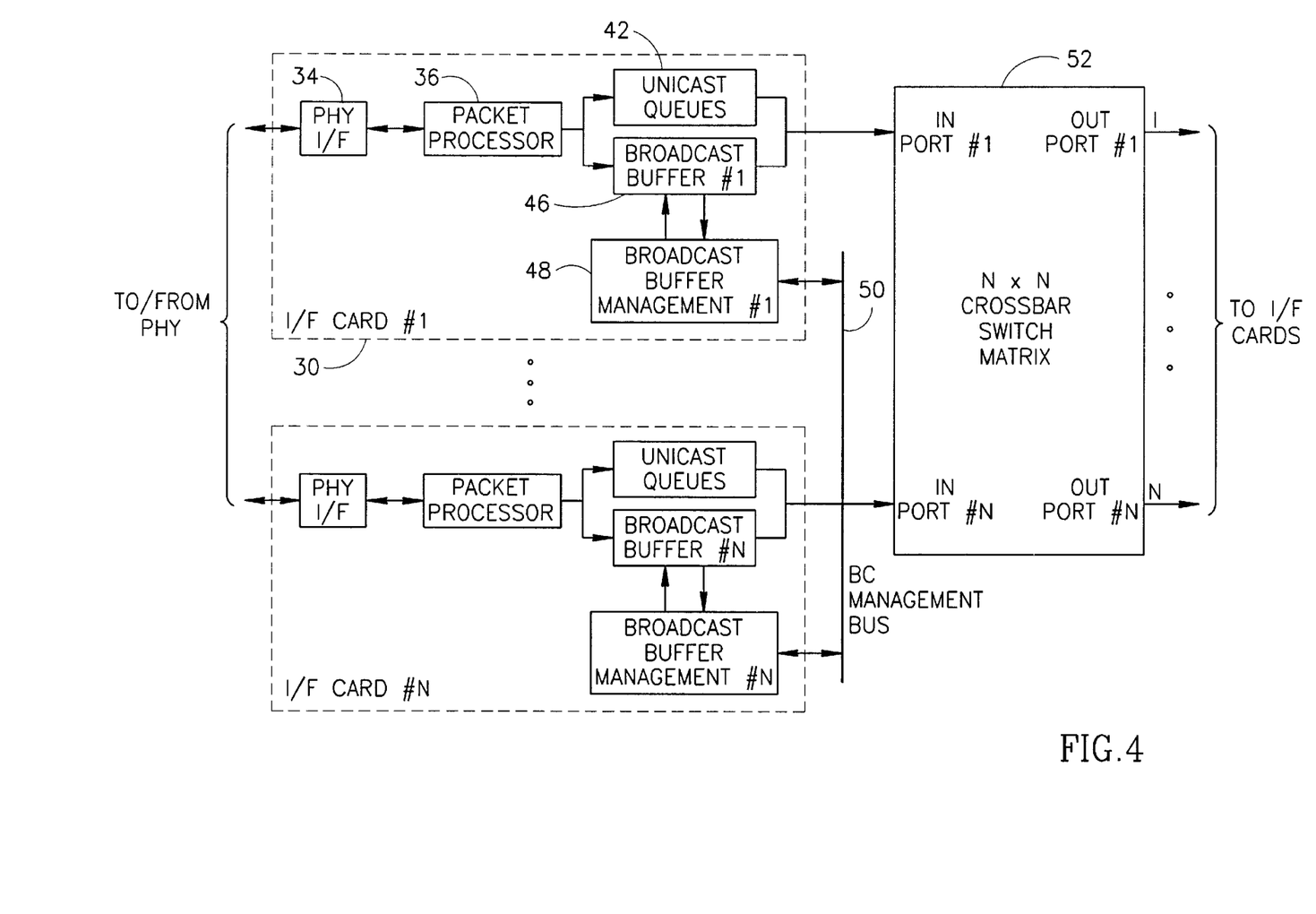
FIG. 4 is a block diagram illustrating a plurality of I/F cards wherein all broadcast buffer management units are connected to a management bus in accordance with the first embodiment of the present invention.

A block diagram illustrating a plurality of I/F cards, wherein all broadcast buffer management units are connected to a management bus in accordance with the first embodiment of the present invention is shown in FIG. 4. A plurality of N interface cards 30 are shown, each comprising a PHY interface 34, packet processor 36, unicast queues 42, broadcast buffer 46 and broadcast buffer management unit 48. The output of the unicast queues and broadcast buffer on each I/F card is input to one of the N input ports on the crossbar switch matrix 52 via the backplane interface 44 (not shown for clarity). In addition, all the broadcast buffer management units 48 are connected to a broadcast management bus 50.

In operation, one broadcast buffer management unit from among all the management units is selected to function as a master with the remaining management units acting as slaves. The selection process can be coordinated in many different ways, e.g., via self-election from among all the units, selection via a host computer, selection via a controller on the crossbar switch matrix, etc.

Once selected, however, the remaining management units are controlled by the master. The master management unit determines when and the duration each I/F card is permitted to transmit packets from its broadcast buffer to the switch matrix.

Figure 5:
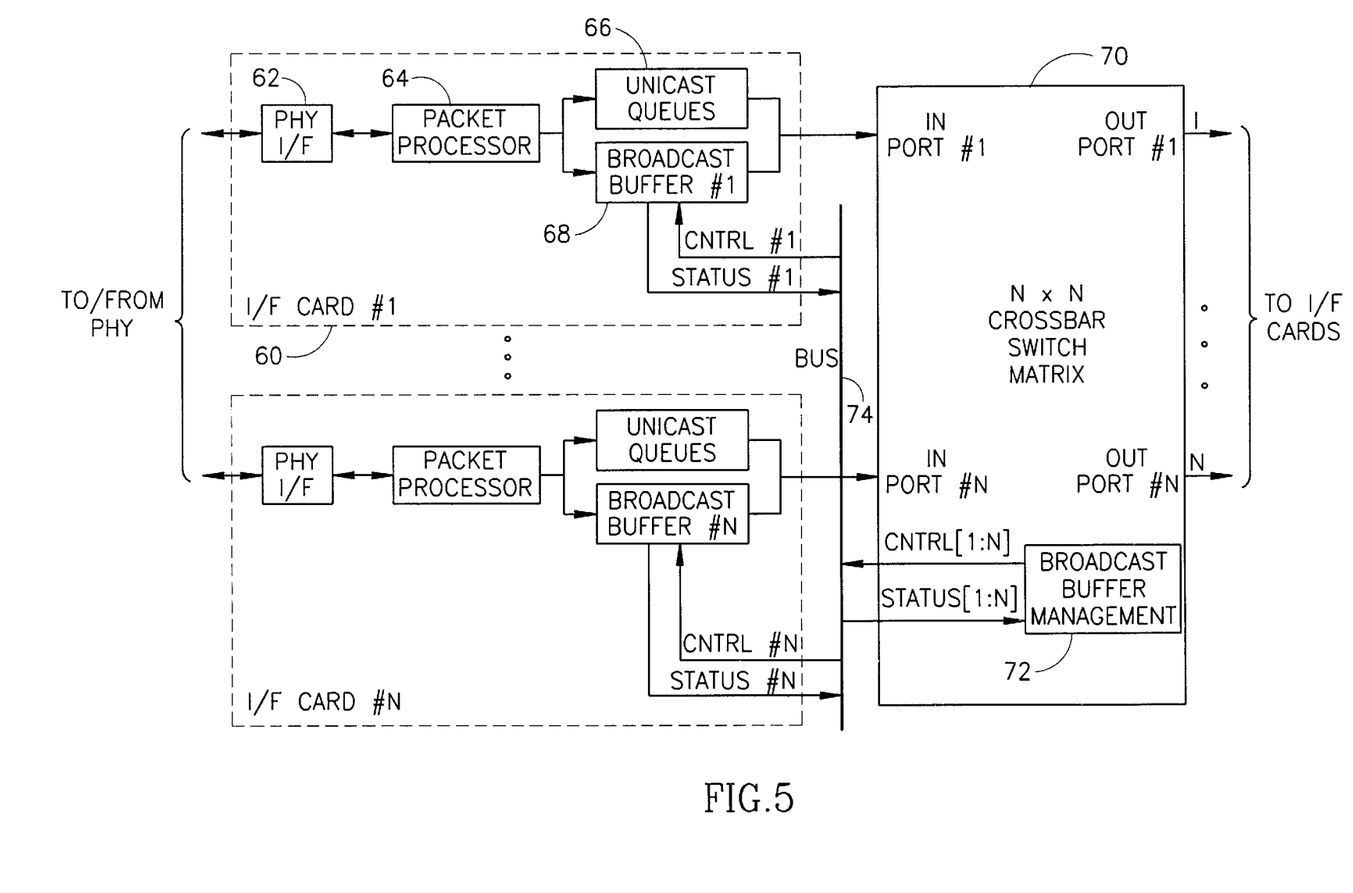
FIG. 5 is a block diagram illustrating a plurality of I/F cards wherein all broadcast buffers are connected to a broadcast buffer management unit via a bus in accordance with a second embodiment of the present invention.

In a second embodiment of the present invention, rather than include a management unit on each interface card, only a single management unit is located in the switch matrix or other suitable location. A block diagram illustrating a plurality of I/F cards wherein the all broadcast buffers are connected to a broadcast buffer management unit via a bus in accordance with a second embodiment of the present invention is shown in FIG. 5. The crossbar switch 70 comprises the broadcast buffer management unit 72 that is coupled to the bus 74. Each of the N interface cards 60, comprises a PHY interface 62, packet processor 64, unicast queues 66 and broadcast buffer 68.

The broadcast buffer on each I/F card is coupled to the bus 74 via status and control signal lines. The output of the unicast queues 66 and broadcast buffer 68 of each I/F card is coupled to an input port on the switch matrix 70 via a backplane interface (not shown for clarity).

An advantage of the crossbar switching system of the second embodiment is that an election of one of the management units to be the master is not required. Only one management unit exists in the system.

In both embodiments, the broadcast buffer management unit executes a decision process to determine when and from which broadcast buffer on which I/F card to transmit broadcast packets. One suitable decision technique is to use a round robin arbitration approach that may or may not be weighted. The weighted approach, well known in the art, is described here.

The algorithm can be configured, utilizing software commands, to assign different weights to one or more broadcast buffers in the interface cards. It may be desirable to set priorities such as when the crossbar switch is handling data from time critical applications. Even if one or a group of broadcast buffers are assigned a higher priority, however, the switch matrix will not be saturated with high priority broadcast packets due to the fairness of the round robin technique.

An example table matrix suitable for use with the round robin arbitration technique of the present invention is presented below.

| Buffer Number | Status | Weight |
|---|---|---|
| 1 | Empty | 1 |
| 2 | Almost Empty | 4 |
| . | . | . |
| . | . | . |
| . | . | . |
| N | Almost Full | 2 |

In this example, the possible values for the status includes: empty, almost empty, almost full and full. The possible weights include: 1, 2, 3 and 4, with 1 representing the highest priority and 4 the lowest priority. The broadcast buffer management unit is operative to periodically scan the status of each broadcast buffer. Alternatively, each broadcast buffer may periodically transmit its status to the management unit. The management unit makes its decision as to which broadcast buffer to enable transmission based on, among other things, the status of the broadcast buffers.

The control software in the switch not only configures the various weights of the broadcast buffers but also configures the mechanism of determining when to cease unicast transmission and enter the broadcast state. Depending on the mechanism, this comprises setting the broadcast duration in terms of time or number of packets. In addition, a minimum waiting time period is set which provides a minimum time for unicast transmission following a broadcast transmission. Note that if there is no broadcast packets awaiting transmission in any of the broadcast buffers, then the minimum time is ignored and unicast transmission continues until broadcast packets arrive and the broadcast buffer management unit decides to switch to the broadcast state.

As described previously, once the broadcast state is entered, the flow of broadcast packets can be controlled in accordance with user provided settings. In particular, the flow of broadcast packets can be limited, for example, by time, i.e., only permit transmission for a certain period of time or by the number of packets, i.e., cease transmitting broadcast packets after a certain number have been transmitted.

Note that not flow controlling the transmission of broadcast packets may result in locking out the switch matrix from the transmission of unicast packets. Without flow control, the switch will be effectively blocked from unicast packet transmission.

Note also that the depth of the broadcast packets, in combination with the policy configured on the broadcast buffer management unit, determines the time delay permitted between broadcast states. A deeper broadcast buffer permits more broadcast packets to be stored until the next transmission time. This achieves a greater spread in the overhead delay involved when switching from the unicast to the broadcast state.

Figure 6:
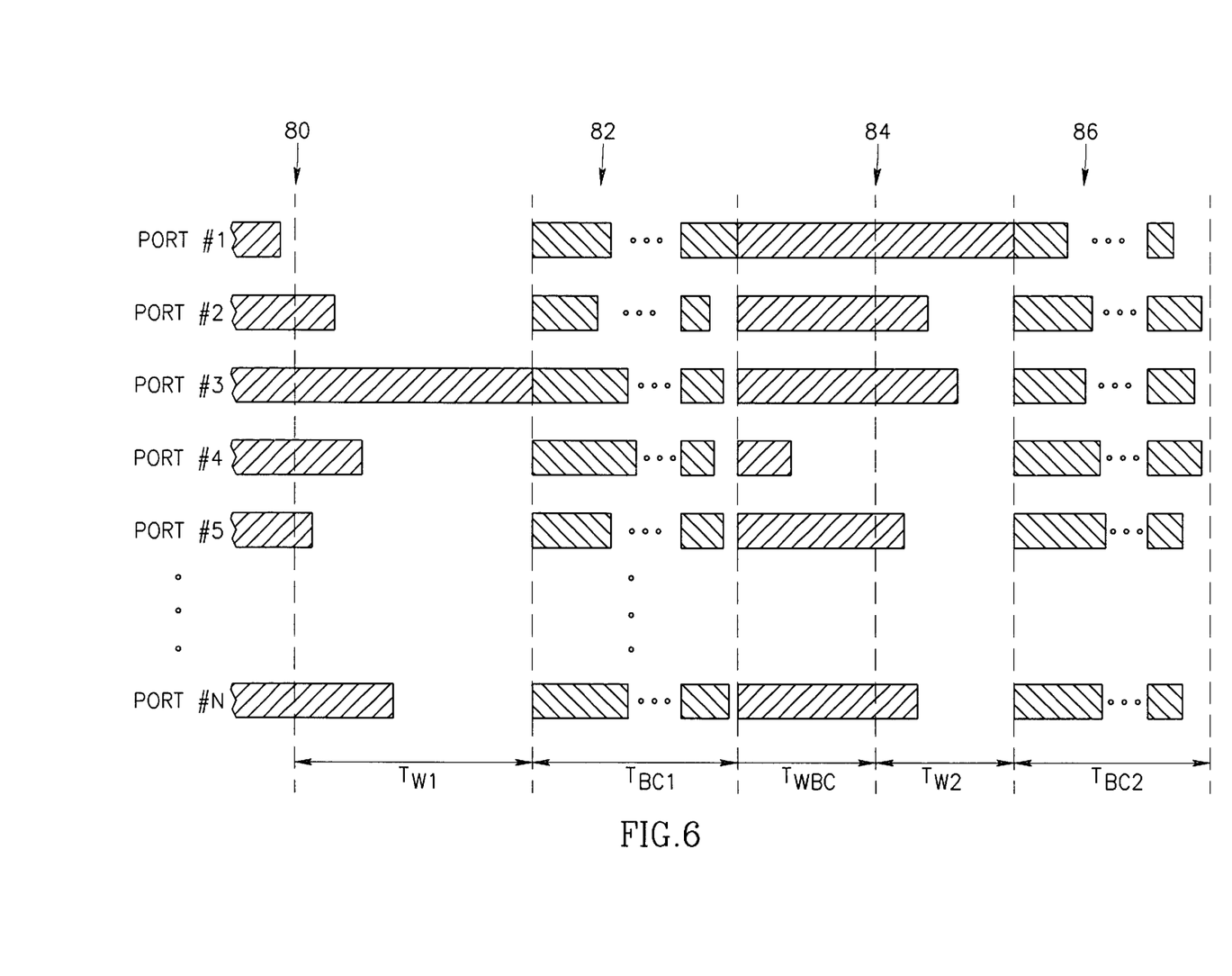
FIG. 6 is a diagram illustrating the timing of, the transmission of packets as they exit the switch matrix of the present invention before and after broadcast packets are scheduled for transmission.

A diagram illustrating the timing of the transmission of packets as they exit the switch matrix of the present invention before and after broadcast packets are scheduled for transmission is shown in FIG. 6. As an example, the output of the switch matrix for ports #1 through #5 and port #N are shown. At a point in time (represented by reference 80) the broadcast buffer management unit decides to switch from the unicast state to the broadcast state. The management unit must wait until the last unicast packet finishes transmission through the matrix. This time is denoted as time Twi. The decision to switch to the broadcast state may be made utilizing a variety of techniques and criteria as described previously.

Following the last unicast packet, the management unit schedules the transmission of one or more broadcast packets 82. The duration of time allotted to broadcast packet transmission, denoted as time $T_{BC1}$, is determined using one of a variety of ways, e.g., time period expiring, number of packets exceeded, etc.

The matrix waits for the last broadcast packet to be transmitted before switching back to the unicast state. Unicast packets again are transmitted through the switch for at least a minimum time period as denoted by $T_{WBC}$. They are transmitted indefinitely if there are no broadcast packets waiting in any of the broadcast buffers. If there are, the management unit determines the next point in time to switch to the broadcast state (referenced 84) and again waits for the final unicast packet to finish transmission. At that point, the broadcast state is entered and one or more broadcast packets 86 from the buffers are input to the switch matrix. Broadcast packets are transmitted for a time duration of $T_{BC2}$ as determined by the management unit.

Figure 7:
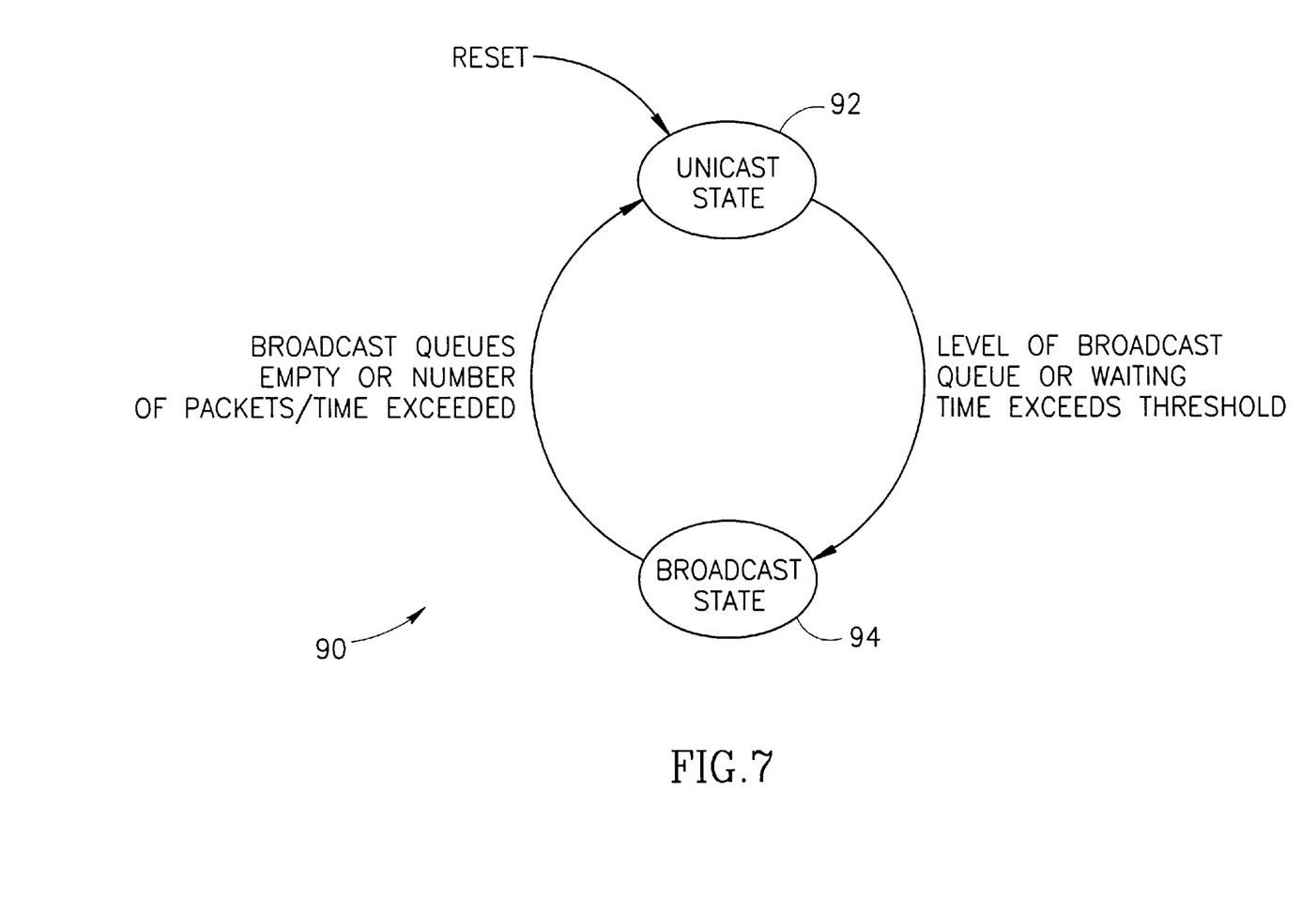
FIG. 7 is a state diagram illustrating the state transitions for the broadcast buffer management unit of the present invention.

A state diagram illustrating the state transitions for the broadcast buffer management unit of the present invention is shown in FIG. 7. The arbitration mechanisms may be implemented using any suitable control means. One such suitable control means is to use a state machine to handle the arbitration of the states in the I/F cards. The state machine, generally referenced 90, comprises two states as described above: a unicast state 92 and a broadcast state 94.

While the device is in the unicast state 92, broadcast packets are stored in the broadcast buffer. The device transitions from the unicast (which it enters upon reset) to the broadcast state in accordance with the policy configured by the user or other entity. Two examples include (1) when the level of the broadcast buffers exceed a threshold or (2) when the waiting time between broadcast transmissions exceeds a threshold.

While in the broadcast state, the contents of the broadcast buffers in each I/F card are read out and transmitted through the switch matrix. Broadcast packet transmission continues until halted by the management unit. This point may be determined also by user configurable means. Examples include (1) when all buffers have been emptied, (2) when a time duration threshold has been exceeded or (3) when a particular number of packets have been transmitted.

Note that the invention is also suitable for use with multicast transmission. In one alternative embodiment, the I/F cards are adapted to place copies of the packet to be multicast into multiple unicast queues before the switch matrix. In this fashion, the multicast is handled before packets reach the switch matrix. Thus, multicast packets are processed as a plurality of unicast packets. Therefore, queues are only required for unicast and broadcast packet transmission.

While the invention has been described with respect to a limited number of embodiments, it will be appreciated that many variations, modifications and other applications of the invention may be made.

What is claimed is:

1. A crossbar switching system for switching variable length unicast and broadcast packets, comprising:
   an N×N crossbar switch matrix comprising N input ports and N output ports, the switch matrix adapted to couple data present at any input port to any output port in accordance with one or more switch configuration commands; and
   N interface (I/F) circuits, each I/F circuit coupled to a corresponding input port and output port on the switch matrix, each I/F circuit comprising:
   N unicast queues, each unicast queue corresponding to a different output port on the switch matrix;
   a broadcast buffer adapted to store a plurality of broadcast packets; and
   a broadcast buffer management unit adapted to periodically halt the transmission of unicast packets to said crossbar switch matrix to permit the consecutive transfer of broadcast packets thereto, said broadcast buffer management unit adapted to store broadcast packets arriving to said I/F circuit in said broadcast buffer, said broadcast buffer management unit operative to consecutively transfer the contents of said broadcast buffer to said crossbar switch matrix while the transmission of said unicast packets is suspended, the transmission of said unicast packets resuming following the completion of transmission of said broadcast packets.

2. The system according to claim 1, wherein only one of said N buffer management units on said N I/F cards functions as a master management unit, the remaining functions as slave units.

3. The system according to claim 1, wherein said broadcast buffer management unit is adapted to halt the transmission of unicast packets upon the number of broadcast packets in said broadcast buffer exceeding a predetermined threshold.

4. The system according to claim 1, wherein said broadcast buffer management unit is adapted to halt the transmission of unicast packets upon the length of time from the last broadcast packet transmission exceeding a predetermined threshold.

5. The system according to claim 1, wherein said broadcast buffer management unit is adapted to enable the transmission of a predetermined number of broadcast packets, said predetermined number of packets configurable by a user.

6. The system according to claim 1, wherein said broadcast buffer management unit is adapted to enable the transmission of broadcast packets for a predetermined length of time, said predetermined length of time configurable by a user.

7. The system according to claim 1, wherein each interface circuit is adapted to operate in either a unicast state or a broadcast state, wherein in said unicast state, unicast packets are stored in said unicast queues and transmitted towards said switch matrix while arriving broadcast packets are stored in said broadcast buffer, and wherein in said broadcast state, unicast transmission is suspended and broadcast packets are transmitted from said broadcast buffer to said switch matrix.

8. A crossbar switching system for switching variable length unicast and broadcast packets, comprising:

an N×N crossbar switch matrix comprising N input ports and N output ports, the switch matrix adapted to couple data present at any input to any output port in accordance with switch configuration commands, said crossbar switch matrix comprising:
- a management bus adapted to send and receive a plurality of broadcast buffer management control and status signals;
- a broadcast buffer management unit coupled to said management bus;

N interface (I/F) circuits, each I/F circuit coupled to a corresponding input port and output port on the switch matrix, each I/F circuit comprising:
- N unicast queues, each unicast queue corresponding to an output port on the switch matrix;
- a broadcast buffer coupled to said management bus, said broadcast buffer adapted to store a plurality of broadcast packets; and wherein said broadcast buffer management unit adapted to periodically halt the transmission of unicast packets to said crossbar switch matrix to permit the consecutive transfer of broadcast packets thereto, said broadcast buffer management unit adapted to store broadcast packets arriving to said I/F circuit in said broadcast buffer, said broadcast buffer management unit operative to consecutively transfer the contents of said broadcast buffer to said crossbar switch matrix while the transmission of said unicast packets is suspended, the transmission of said unicast packets resuming following the completion of transmission of said broadcast packets.

9. The system according to claim 8, wherein said broadcast buffer management unit is adapted to halt the transmission of unicast packets upon the number of broadcast packets in said broadcast buffer exceeding a predetermined threshold.

10. The system according to claim 8, wherein said broadcast buffer management unit is adapted to halt the transmission of unicast packets upon the length of time from the last broadcast packet transmission exceeding a predetermined threshold.

11. The system according to claim 8, wherein said broadcast buffer management unit is adapted to enable the transmission of a predetermined number of broadcast packets, said predetermined number of packets configurable by a user.

12. The system according to claim 8, wherein said broadcast buffer management unit is adapted to enable the transmission of a broadcast packet for a predetermined length of time, said predetermined length of time configurable by a user.

13. The system according to claim 8, wherein each interface circuit is adapted to operate in either a unicast state or a broadcast state, wherein in said unicast state, unicast packets are stored in said unicast queues and transmitted towards said switch matrix while arriving broadcast packets are stored in said broadcast buffer, and wherein in said broadcast state, unicast transmission is suspended and broadcast packets are transmitted from said broadcast buffer to said switch matrix.

* * * * *